United States Patent [19]

Reiter

[11] 3,994,385

[45] Nov. 30, 1976

[54] CONVEYOR BELT CLEANER

[75] Inventor: Robert C. Reiter, Aurora, Ill.

[73] Assignee: Material Control, Inc., Aurora, Ill.

[22] Filed: Aug. 29, 1975

[21] Appl. No.: 609,029

[52] U.S. Cl. ................................ 198/499; 198/364
[51] Int. Cl.² ........................................ B65G 15/00
[58] Field of Search ............... 198/230, 188, 229; 74/230

[56] References Cited
UNITED STATES PATENTS

| 2,652,920 | 9/1953 | Bowman | 198/230 |
| 2,794,540 | 6/1957 | Sinden | 198/230 |
| 3,795,308 | 3/1974 | Oury | 198/230 |

*Primary Examiner*—John J. Love
*Assistant Examiner*—Douglas D. Watts
*Attorney, Agent, or Firm*—Cullen, Settle, Sloman & Cantor

[57] ABSTRACT

The conveyor belt cleaner serves as a mechanical cleaner for an endless conveyor belt entrained about a pair of drums and includes a plurality of independently operable scraper or wiper blade assemblies for removing from the conveyor belt various types of abrasives and other objectionable foreign material. Each scraper blade assembly includes an elongated arm or lever which is pivotally mounted on a pivot pin of a bracket assembly. Adjustable stop means is interposed between the bracket assembly and the arm at one side of the pivot pin to limit the pivotal movement of the arm in one direction. An extension spring is interposed between the bracket assembly and the arm at the other side of the pivot pin for urging the arm in said one direction to bias the scraper blade, secured to one end of the arm, towards the belt. As the blade wears, the extension spring pivots the arm and continues to bias the blade towards the belt, with the pivoting of the arm being limited by the adjustable stop means.

14 Claims, 6 Drawing Figures

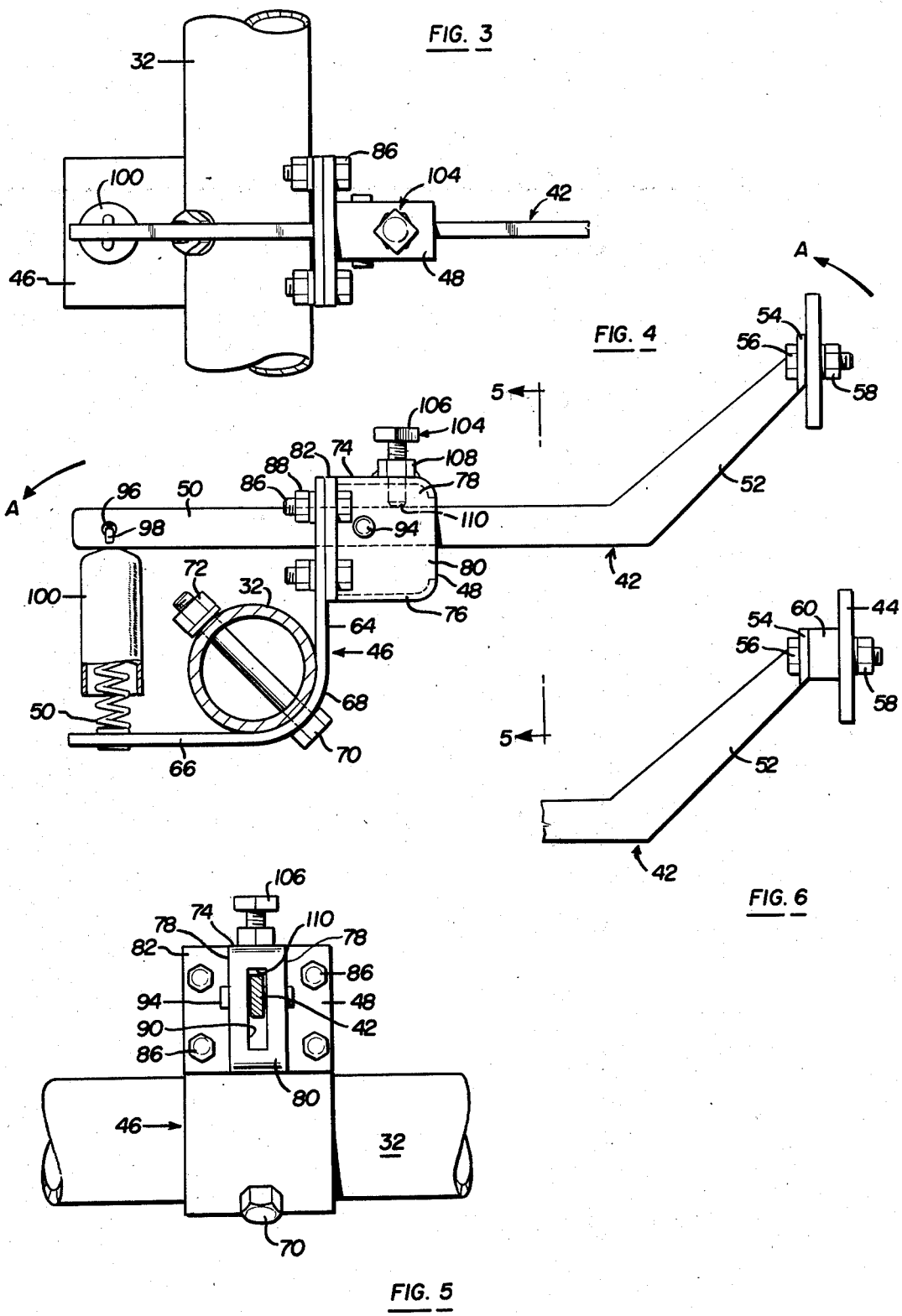

CONVEYOR BELT CLEANER

BACKGROUND OF THE INVENTION

1. Field of the Invention

A conveyor belt cleaner for an endless conveyor belt is trained about a pair of rollers and comprises a plurality of independently operable scraper blade assemblies for removing from the conveyor belt abrasive and/or foreign materials. Because of the tendency of the belt to accumulate adhering material, it is commonplace to provide beneath the return strand of the belt a plurality of scraper blades to remove this material.

2. Description of the Prior Art

My U.S. Pat. No. 3,342,312 dated Sept. 19, 1967, discloses a mechanical cleaner assembly mounted underneath the return run or strand of the conveyor belt and subjected primarily to bending and torsional forces. The cleaner includes a plurality of torsion springs or arms, each arm operating independently of the other. One end portion of each torsion arm is fixedly connected to the supporting frame and the other end portion, which is free, is provided with a reversible wiper blade which is engageable with a conveyor belt to clean and wipe the abrasive material therefrom.

U.S. Pat. No. 3,656,610 of Michael R. McWilliams, dated Apr. 18, 1972, assigned to the assignee of record, discloses a plurality of independently operable spring-wiper blade assemblies including spring or torsion arms which are mounted on a support structure by means of a resilient mounting structure which absorbs vibration and shock and thereby minimizes fatigue and breakage of the spring arms.

U.S. Pat. No. 3,504,786 of Carl G. Matson, dated Apr. 7, 1970, discloses a conveyor belt cleaner including a plurality of blade-torsion arm assemblies of the aforementioned type, with the blades arranged diagonally of the length of the run in overlapping echelon fashion so as to cause the scraped material to be directed toward a discharge at one end of the run.

U.S. Pat. No. 3,598,231 of Carl G. Matson, dated Aug. 10, 1971, discloses a conveyor belt cleaner having a plurality of elongated torsion arms, with each arm attached to a support so that each arm is rockable relative to the support and relative to the other arms generally about the length of the support.

U.S. Pat. No. 2,794,540 of Alfred D. Sinden, dated June 4, 1957, discloses a belt cleaner in which leaf springs are provided for the wiper blades.

Each of the prior art patents noted previously utilizes a plurality of torsion of leaf springs or arms for carrying the wiper blades. It has been found that a torsion spring will have a long life but cannot be made uniformly. A leaf spring can be made uniformly but does not have as long a life in a belt cleaning application as a torsion spring.

SUMMARY OF THE INVENTION

The present invention has certain economical and functional advantages over the prior art patents incorporating torsion or leaf springs or arms. The belt cleaner of the present invention includes a plurality of scraper blade assemblies secured to a support for independent movement, with each assembly comprising an elongated arm adapted to be disposed lengthwise of the endless belt and having a scraper blade secured on one end thereof which is adapted to engage and is disposed transversely of one run of the belt. Each scraper blade assembly also includes a bracket assembly secured to the support. Each arm is pivotally mounted on a pivot pin carried by the bracket assembly. Adjustable stop means is interposed between the bracket assembly and the arm at one side of the pivot pin to limit the pivotal movement of the arm in one direction. An extension spring is interposed between the bracket assembly and the arm at the other side of the pivot pin for urging the arm in said one direction and biasing the blade towards one run of the belt. The advantage of the present invention over the prior art is in the use of a pivotally mounted arm and an extension spring for biasing the arm in a direction to urge the blade against the belt and to thereby compensate for any wear occurring in the wiper blade. It is found that an extension spring has an advantage over torsion or leaf springs in that the extension spring combines a long life and uniformity in a belt cleaning application.

DESCRIPTION OF THE DRAWINGS

FIG. 3 is a fragmentary top view of one scraper blade assembly mounted on a support;

FIG. 4 is a side elevational view, partly in section, of the scraper blade assembly illustrated in FIG. 3;

FIG. 5 is a front elevational view of the scraper blade assembly, partly in section, looking in the direction of arrows 5—5 of FIG. 4; and FIG. 6 is a fragmentary side elevational view of the wiper blade end of an arm of the cleaner.

DESCRIPTIONS OF PREFERRED EMBODIMENTS

Figure 1:
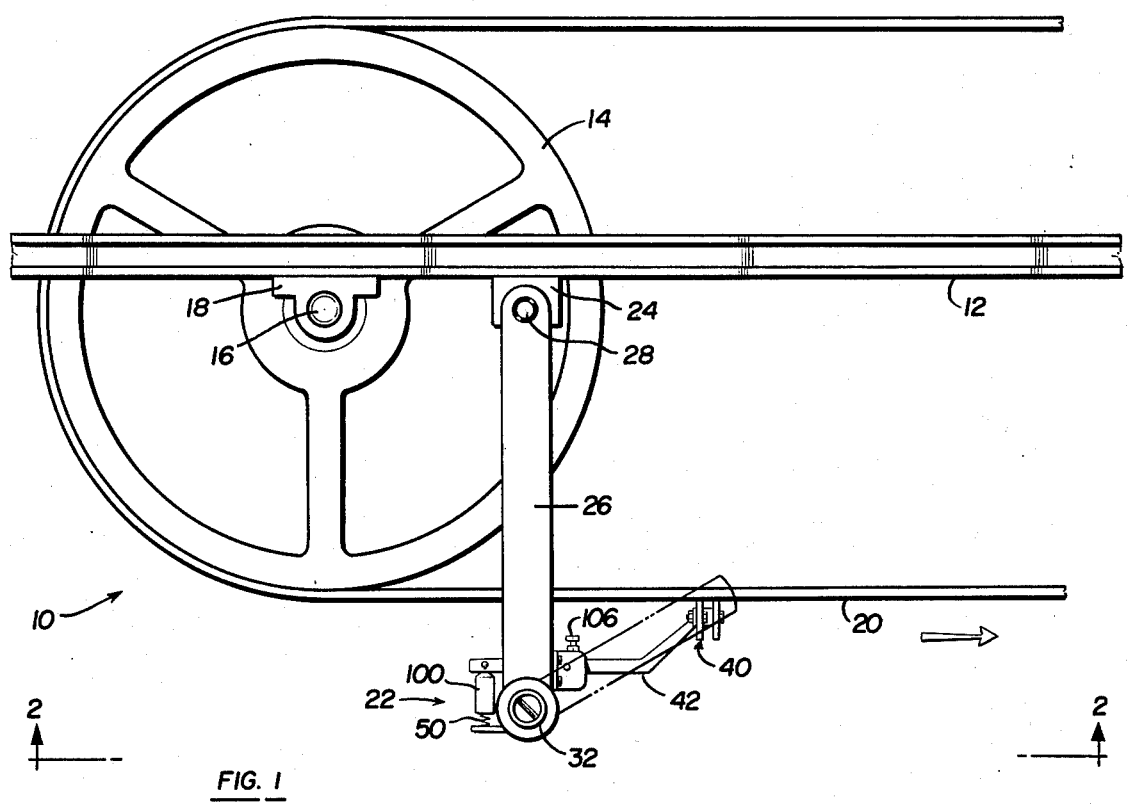
FIG. 1 is a fragmentary side view of the belt conveyor and of the mechanical cleaner therefor, with the cleaner mounted beneath the return strand or run of the conveyor belt and in an operative position.
Figure 2:
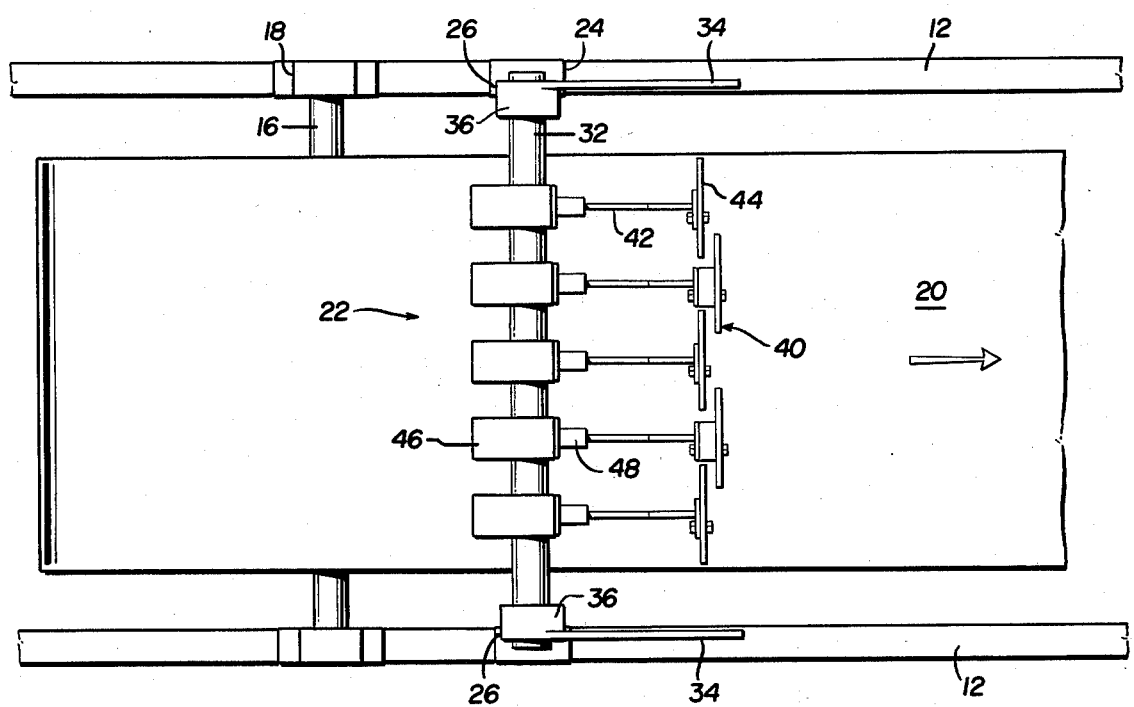
FIG. 2 is a fragmentary bottom view of the belt conveyor and cleaner illustrated in FIG. 1.

The conveyor illustrated in FIGS. 1 and 2 is designated by the numeral 10 and includes a frame 12 which supports a pair of pulleys or rollers, the head pulley or roller being designated by the numeral 14. The roller 14 is mounted on a shaft 16 which is supported by lugs or bearings 18 carried by the frame 12. Wrapped around the rollers is an endless conveyor belt 20. The life of the belt 20 may be extended by removing therefrom abrasive or foreign materials whether wet, dry or sticky. The belt 20 is cleaned by means of a mechanical belt cleaner designated by the numeral 22 in FIGS. 1 and 2.

The mechanical belt cleaner 22 includes a mounting assembly for locating the cleaner 22 beneath the return run of the belt as shown in FIGS. 1 and 2. The mounting assembly comprises a pair of hanger clips 24, one at each side of frame 12 (FIG. 2), secured and fastened to the frame 12 by bolts or other means not shown. A hanger 26 is connected to each bracket 24 by means of a pin connection 28. The hangers 26 are located at opposite sides of the conveyor belt 20 and arranged generally vertically as illustrated in FIG. 1.

The assembly further includes a transversely extending tube or tubular support 32 underneath the return strand of the belt 20 and spaced therefrom as illustrated in FIG. 1. Operating levers or handles 34 provided with sleeve portions 36 at one end thereof are provided on opposite ends of the tubular support 32 (FIG. 2). The levers or handles 34 assist in the positioning of the wiper or scraper blade assemblies 40 for proper blade pressure and other adjustments as is well known in the art.

The tubular support 32, as noted in FIG. 2, is provided with a plurality of transversely spaced apart scraper blade assemblies 40 which are arranged in parallel. Each scraper blade assembly 40, as noted in FIGS. 3–5 inclusive, includes an elongated arm 42, a wiper blade 44, a bracket 46, a bracket housing 48 secured to the bracket 46, an extension spring 50 and other component parts to be subsequently identified.

Arm 42 is made from steel, is generally straight when viewed from the top or bottom as noted in FIG. 2, is of uniform thickness and is of rectangular configuration throughout its longitudinal extent. The arm 42, when viewed from the side as noted in FIG. 4, includes an elongated relatively straight portion 50 and a shorter portion 52 which is inclined upwardly at an angle with respect to the straight portin 50. The inclined arm portion 52 provided at one end of arm 42 is provided with a flange 54 bent at a right angle thereto. The wiper or scraper blade 44 is secured to one end of the arm 42 by means of a bolt 56 which extends through an opening provided in the flange 54 and in the wiper blade 44. A nut 58 is threaded onto the bolt 56 to secure the wiper blade to the arm 42.

As noted in FIG. 2, the wiper blade assemblies 40 are mounted on the support 32 in overlapping relation. In order to accomplish same, it is necessary that the blades 44 of adjacent assemblies 40 be offset from the other so that the blades 44 will not strike one another. This is accomplished, as an example, as shown in FIG. 6 by utilizing a tubular spacing element 60 which is interposed between the arm flange 54 and the wiper blade 44. The bolt 56 thus extends through the openings provided in the arm flange 54, spacer 60 and wiper blade 44.

The bracket 46 and bracket housing 48 forms a bracket assembly, with the bracket 46 including a pair of legs 64 and 66, located 90° apart, which are interconnected by a generally curved portion 68. The bracket 46 is secured to the tubular support 32 by means of a bolt 70 and nut 72 (FIG. 4). Bolt 70 extends through openings provided in the curved portion 68 of the bracket 46 and in the tubular support 32, with the nut 72 being threaded to the bolt 70 to maintain the tubular support 32 in close contact with the curved portion 68 of the bracket 46. The leg 64 of bracket 46 is vertical while the leg 66 is generally horizontal as noted in FIG. 4.

The bracket housing 48 includes a top wall 74, a bottom wall 76, a pair of side walls 78, a front wall 80 and a back wall 82. The back wall 82 abuts the vertical leg 64 of bracket 46 and is secured thereto by means of a plurality of threaded bolts 86 and nuts 88. The back wall 82 and the front wall 80 of the housing 48 as well as the leg 64 of bracket 46 are provided with openings 90 through which the elongated arm or lever 42 extends as best shown in FIGs. 4 and 5. The bracket housing 48 is provided with a pivot pin 94 which extends through and is carried by the side walls 78. The bracket housing 46 provides a protective dust or dirt shield for the pivot pin 94. The pin 94, as an example, may take the form of a hardened steel pin carried by a bushing.

The other end of the arm 42 is provided with an opening 96 to which is connected one hook end 98 of the extension spring 50. The other end of the extension spring 50 is secured to the generally horizontal leg 66 of the bracket 46 as shown in FIG. 4. A tubular dust or dirt shield 100 is carried by the spring 50 for the purpose of preventing dirt from accumulating on and impeding the effectiveness of the spring 50.

The extension spring 50 is effective to urge the arm 42 about pivot pin 94 in the direction indicated by arrows A. In order to limit the amount of pivotal movement of the arm 42 by the spring 50, the bracket housing 48 is provided with an adjustable stop 104 which includes a bolt 106 and a nut 108. The nut 108 is welded or otherwise secured to the top wall 74. The nut 108 carries the threaded bolt 106 which has a leading end surface 110 adapted to engage the opposing surface of the arm 42 as shown in FIG. 5 and to thereby stop the upward movement of the arm 42.

The spring 50 and the adjustable stop 104 are located on opposite sides of the pivot pin 94. As the wiper blade 44 wears, the spring 50 urges or biases the blade 44 against the belt 20 provided the arm 42 is not limited by the stop 104. Adjustment of the stop 104 in one direction will provide an increase in travel of the arm 42, while adjustment of the stop 104 in the opposite direction will provide a decrease in travel of the arm 42. As the blade 44 wears the stop bolt 106 would be rotated in a direction to permit the arm 42 to pivot through a greater distance, thus compensating for the height of the blade 44.

What is claimed is:

1. A scraper blade assembly for a belt cleaner mounted on a conveyor having a rotatable drum and an endless belt trained about the drum and providing delivery and return runs, with the belt cleaner including a support fixedly located transversely of and adjacent to one of the runs, said scraper blade assembly comprising an elongated arm adapted to be disposed lengthwise of said one run and having a scraper blade secured on one end thereof which is adapted to engage and to be disposed transversely of said one run, and a support bracket assembly adapted to engage and to be secured to the support, pivot means rotatably mounting said arm on said bracket assembly, stop means interposed between said bracket assembly and said arm on the side of said pivot means on which said one end of said arm is disposed to limit the movement of said arm in one direction about said pivot means, and an extension spring means connected between said bracket assembly and said arm on the opposite side of said pivot means for urging said arm in said one direction about said pivot means to bias said blade towards said one run.

2. The scraper blade assembly defined in claim 1 wherein said pivot means is in the form of a pivot pin extending through an intermediate portion of said arm, with the end portions of said pivot pin being carried by said bracket assembly.

3. The scraper blade assembly defined in claim 1 wherein said stop means is carried by said bracket assembly.

4. The scraper blade assembly defined in claim 1 wherein said stop means is adjustable.

5. The scraper blade assembly defined in claim 4 wherein said stop means is in the form of a threaded bolt and nut, said nut being secured to said bracket assembly and said bolt being adjustably carried by said nut with the leading end on said bolt engageable with said arm.

6. The scraper blade assembly defined in claim 5 wherein a tubular dirt shield surrounds and is carried by said extension spring.

7. The scraper blade assembly defined in claim 1 wherein said support bracket assembly comprises a bracket and a bracket housing, said bracket having a pair of generally straight legs located approximately 90° apart, with the legs being connected by a curved portion adapted to engage the support, with one leg having an opening through which said arm extends, said bracket housing being secured to said one leg of said bracket and having an opening aligned with the opening in said one leg and through which said arm extends, said pivot means being carried by said bracket housing.

8. The scraper blade assembly defined in claim 7 wherein said stop means is in the form of a threaded bolt and nut, said bracket housing enclosing said pivot means and having a top wall, said nut being secured to said top wall of said bracket housing and said bolt being adjustably carried by said nut with the leading end on said bolt engageable with said arm.

9. The scraper blade assembly defined in claim 7 wherein said extension spring means is an extension spring having one end secured adjacent the opposite end of said elongated arm and the opposite end of said spring secured to the other leg of said bracket.

10. The scraper blade assembly defined in claim 8 wherein said extension spring means is an extension spring having one end secured adjacent the opposite end of said elongated arm and the opposite end of said spring secured to the other leg of said bracket.

11. The scraper blade assembly defined in claim 7 wherein said bracket housing includes a top wall and a pair of side walls, said pivot means being in the form of a pivot pin extending through an intermediate portion of said arm, with the end portions of said pivot pin being carried by the side walls of said bracket housing.

12. The scraper blade assembly defined in claim 11 wherein said stop means is in the form of a threaded bolt and nut, said nut being secured to the top wall of said bracket housing and said bolt being adjustably carried by said nut with the leading end on said bolt engageable with said arm.

13. The scraper blade assembly defined in claim 12 wherein said extension spring means is an extension spring having one end secured adjacent the opposite end of said elongated arm and the opposite end of said spring secured to the other leg of said bracket.

14. The scraper blade assembly defined in claim 12 wherein said blade is of rectangular cross section throughout its longitudinal extent.

* * * * *